US012632019B2

(12) United States Patent
Dwarakanath et al.

(10) Patent No.: US 12,632,019 B2
(45) Date of Patent: May 19, 2026

(54) METHOD AND SYSTEM FOR OPTIMAL STOPPING USING FAST PROBABILISTIC LEARNING ALGORITHMS

(71) Applicant: JPMorgan Chase Bank, N.A., New York, NY (US)

(72) Inventors: Kshama Dwarakanath, New York, NY (US); Danial Dervovic, London (GB); Peyman Tavallali, Monroe Township, NJ (US); Svitlana Vyetrenko, Colts Neck, NJ (US); Tucker Richard Balch, Suwanee, GA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 379 days.

(21) Appl. No.: 18/203,748

(22) Filed: May 31, 2023

(65) Prior Publication Data

US 2024/0103465 A1     Mar. 28, 2024

Related U.S. Application Data

(60) Provisional application No. 63/408,661, filed on Sep. 21, 2022.

(51) Int. Cl.
*G05B 13/04* (2006.01)
*G05B 13/02* (2006.01)

(52) U.S. Cl.
CPC ....... *G05B 13/047* (2013.01); *G05B 13/0265* (2013.01)

(58) Field of Classification Search
CPC .................................................. G05B 13/0265
See application file for complete search history.

(56) References Cited

U.S. PATENT DOCUMENTS 8,645,259 B1 * 2/2014 Draganov .............. G06Q 40/04
                                                                705/37
2005/0004819 A1 * 1/2005 Etzioni ................ G06Q 20/201
                                                                705/5

(Continued)

FOREIGN PATENT DOCUMENTS

EP        3913547 A1 * 11/2021   ............... G06N 7/01

OTHER PUBLICATIONS

"A. Constantinides, Modelling price dynamics: A hybrid truncated Lévy Flight—GARCH approach, Jan. 11, 2013, Elsevier, p. 1, https://www.sciencedirect.com/science/article/pii/S0378437113000174?via%3Dihub" (Year: 2013).*

*Primary Examiner* — Santosh R Poudel
(74) *Attorney, Agent, or Firm* — Greenblum & Bernstein, P.L.C.

(57)                ABSTRACT

A method for using a Gaussian Process-based algorithm to approximate an optimal stopping of a time series that corresponds to a sequence of events is provided. The method includes: receiving information that relates to an event sequence; estimating, based on the received information, a first potential reward that is obtained by stopping the event sequence at a first time, and a set of respective second potential rewards that are obtained by stopping the event sequence at corresponding times; and determining, based on the estimated first and second potential rewards, an optimal time for stopping the event sequence. The event sequence may include a numerical sequence that is modeled as a statistical learning method via a Gaussian Process (GP) function and/or a deep GP function that indicates a probability density distribution of the items in the numerical sequence over a predetermined time interval.

16 Claims, 5 Drawing Sheets

(56) References Cited

U.S. PATENT DOCUMENTS

| | | | |
|---|---|---|---|
| 2012/0246050 A1* | 9/2012 | McNew | G06Q 40/00 |
| | | | 705/37 |
| 2012/0290283 A1* | 11/2012 | Li | G06F 30/33 |
| | | | 703/22 |
| 2013/0110750 A1* | 5/2013 | Newnham | G06N 20/00 |
| | | | 706/12 |
| 2022/0101438 A1* | 3/2022 | Gao | G06Q 30/0201 |
| 2023/0325921 A1* | 10/2023 | Kim | G06Q 40/04 |
| 2023/0325922 A1* | 10/2023 | Kim | G06Q 40/04 |

* cited by examiner

400

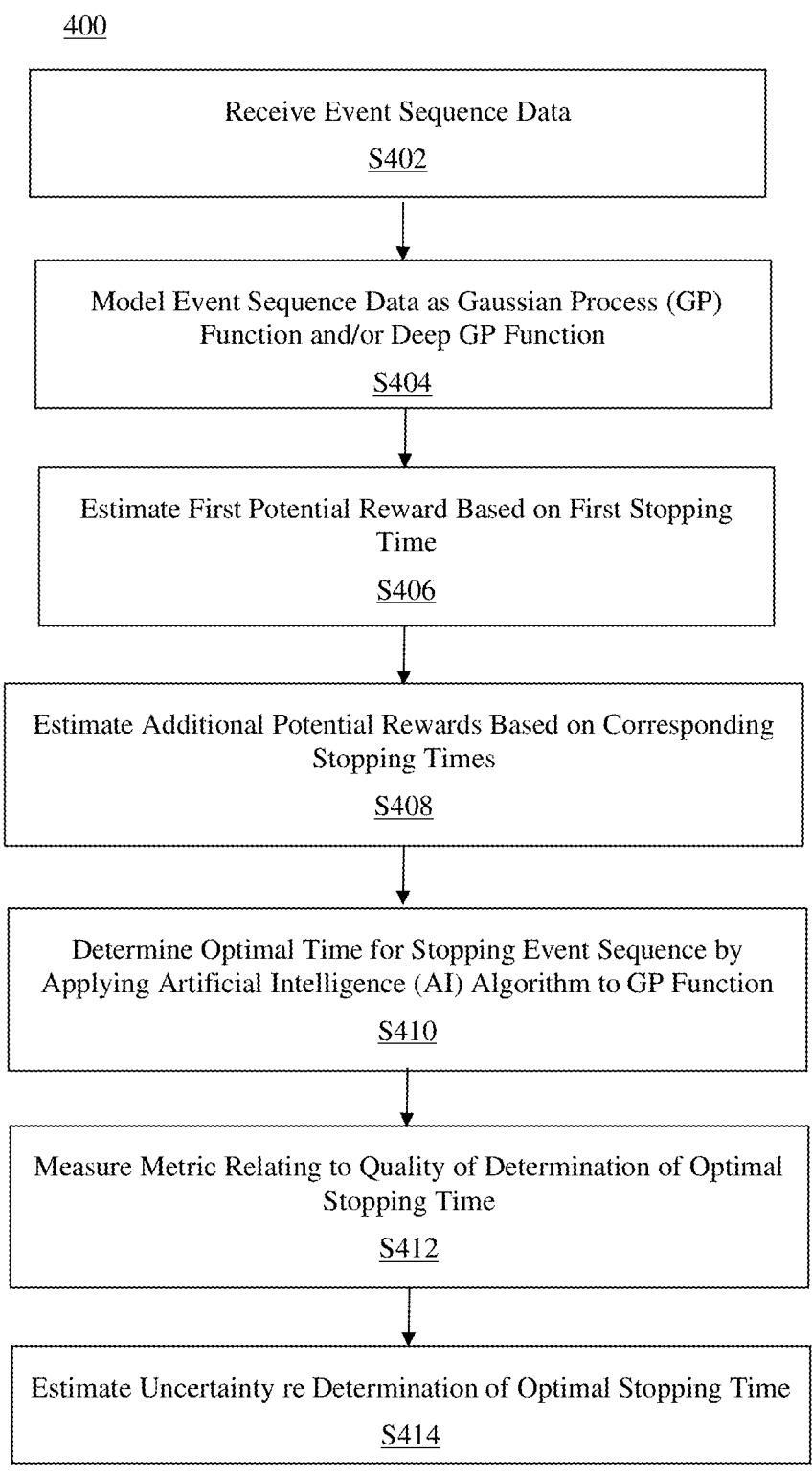

Receive Event Sequence Data

S402

Model Event Sequence Data as Gaussian Process (GP)
Function and/or Deep GP Function

S404

Estimate First Potential Reward Based on First Stopping
Time

S406

Estimate Additional Potential Rewards Based on Corresponding
Stopping Times

S408

Determine Optimal Time for Stopping Event Sequence by
Applying Artificial Intelligence (AI) Algorithm to GP Function

S410

Measure Metric Relating to Quality of Determination of Optimal
Stopping Time

S412

Estimate Uncertainty re Determination of Optimal Stopping Time

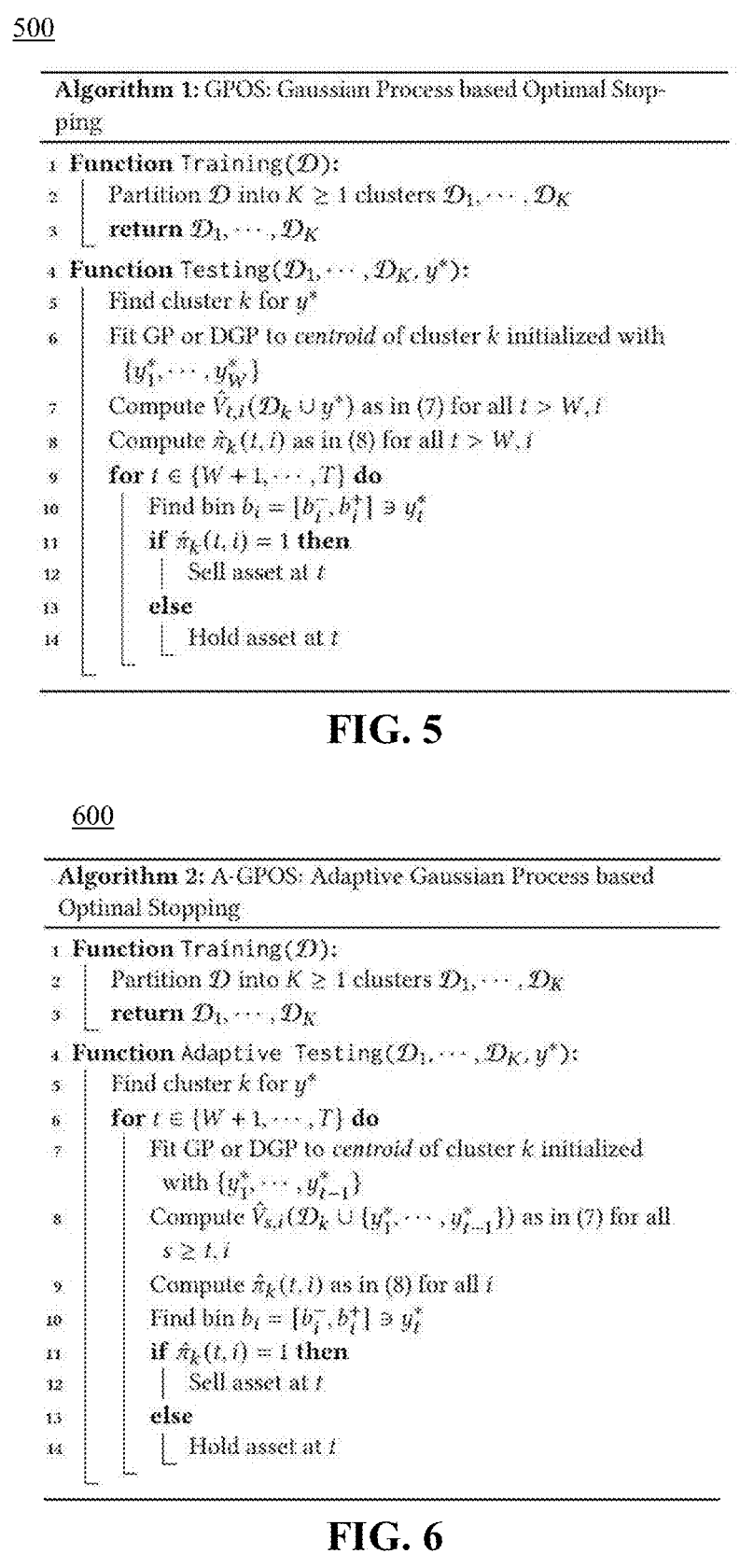

Algorithm 1: GPOS: Gaussian Process based Optimal Stopping

1  Function Training($\mathcal{D}$):
2      Partition $\mathcal{D}$ into $K \geq 1$ clusters $\mathcal{D}_1, \cdots, \mathcal{D}_K$
3      return $\mathcal{D}_1, \cdots, \mathcal{D}_K$
4  Function Testing($\mathcal{D}_1, \cdots, \mathcal{D}_K, y^*$):
5      Find cluster $k$ for $y^*$
6      Fit GP or DGP to *centroid* of cluster $k$ initialized with $\{y_1^*, \cdots, y_W^*\}$
7      Compute $\hat{V}_{t,i}(\mathcal{D}_k \cup y^*)$ as in (7) for all $t > W, i$
8      Compute $\hat{\pi}_k(t, i)$ as in (8) for all $t > W, i$
9      for $t \in \{W+1, \cdots, T\}$ do
10         Find bin $b_i = [b_i^-, b_i^+] \ni y_t^*$
11         if $\hat{\pi}_k(t, i) = 1$ then
12             Sell asset at $t$
13         else
14             Hold asset at $t$

Algorithm 2: A-GPOS: Adaptive Gaussian Process based Optimal Stopping

1  Function Training($\mathcal{D}$):
2      Partition $\mathcal{D}$ into $K \geq 1$ clusters $\mathcal{D}_1, \cdots, \mathcal{D}_K$
3      return $\mathcal{D}_1, \cdots, \mathcal{D}_K$
4  Function Adaptive Testing($\mathcal{D}_1, \cdots, \mathcal{D}_K, y^*$):
5      Find cluster $k$ for $y^*$
6      for $t \in \{W+1, \cdots, T\}$ do
7          Fit GP or DGP to *centroid* of cluster $k$ initialized with $\{y_1^*, \cdots, y_{t-1}^*\}$
8          Compute $\hat{V}_{s,i}(\mathcal{D}_k \cup \{y_1^*, \cdots, y_{t-1}^*\})$ as in (7) for all $s \geq t, i$
9          Compute $\hat{\pi}_k(t, i)$ as in (8) for all $i$
10         Find bin $b_i = [b_i^-, b_i^+] \ni y_t^*$
11         if $\hat{\pi}_k(t, i) = 1$ then
12             Sell asset at $t$
13         else
14             Hold asset at $t$

FIG. 6

METHOD AND SYSTEM FOR OPTIMAL STOPPING USING FAST PROBABILISTIC LEARNING ALGORITHMS

CROSS-REFERENCE TO RELATED APPLICATIONS

This application claims priority benefit from U.S. Provisional Application No. 63/408,661, filed Sep. 21, 2022, which is hereby incorporated by reference in its entirety.

BACKGROUND

1. Field of the Disclosure

This technology generally relates to methods and systems for determining an optimal time for ending an event sequence, and more particularly to methods and systems for using a Gaussian Process-based algorithm to approximate an optimal stopping of a time series that corresponds to a sequence of events.

2. Background Information

The question of when to profitably buy or sell an asset is a long-studied fundamental economic problem, one that is closely related to the mathematical problem of optimal stopping. While optimal stopping problems have been studied before, they have historically been solved analytically in restrictive settings where underlying quantities are independent and identically distributed (iid), with a known data-generating process.

Financial price time series, such as stock prices, display interesting structural properties such as mean-reversion that allow for explicit modeling. Functional data analysis has long been used in modeling time series, thereby enabling long term predictions with the ability to work with irregularly sampled data. In time series modeling, approaches based on Gaussian Processes (GPs) allow long term forecasting in settings with small quantities of data for calibration and those with a need to estimate the covariance of predictions. GPs also come up in finance when studying mean reverting processes called Ornstein-Uhlenbeck (OU) processes, which are GPs with an exponential kernel.

In one conventional approach, a range of methods is developed for automatically choosing GP kernels based on structure observed in the data during training. Processes that are learned this way are called Deep GPs. There remains an open question regarding the ability to leverage the effectiveness of the functional form of GPs to provide an efficient solution to optimal stopping problems under minimal assumptions. Such general stopping problems are ubiquitous in finance, for example in the pricing of American options.

Accordingly, there is a need for a mechanism for using a Gaussian Process-based algorithm to approximate an optimal stopping of a time series that corresponds to a sequence of events.

SUMMARY

The present disclosure, through one or more of its various aspects, embodiments, and/or specific features or sub-components, provides, inter alia, various systems, servers, devices, methods, media, programs, and platforms for methods and systems for using a Gaussian Process-based algorithm to approximate an optimal stopping of a time series that corresponds to a sequence of events.

According to an aspect of the present disclosure, a method for determining an optimal time for stopping an event sequence is provided. The method is implemented by at least one processor. The method includes: receiving, by the at least one processor, first information that relates to the event sequence; estimating, by the at least one processor based on the first information, a first potential reward that is obtained by stopping the event sequence at a first predetermined time; estimating, by the at least one processor based on the first information, a plurality of respective second potential rewards that are obtained by stopping the event sequence at a corresponding one from among a plurality of second predetermined times; and determining, based on the estimated first potential reward and the plurality of estimated second potential rewards, an optimal time for stopping the event sequence.

The determining of the optimal time for stopping the event sequence may include estimating a value function that relates to a look-ahead value associated with the event sequence at a particular time.

The estimating of the value function may be based on an assumption that the value function depends only on a most recent event in the event sequence and a predetermined set of historical data.

The event sequence may include a sequence of asset prices that is modeled by using a Gaussian Process (GP) function that indicates a probability density distribution of the asset prices over a predetermined time interval.

The determining of the optimal time for stopping the event sequence may include applying a non-adaptive artificial intelligence (AI) algorithm that implements a machine learning technique with respect to the first information and the GP function, the non-adaptive AI algorithm being trained by using historical data and fixed warm start data that relates to the event sequence.

The determining of the optimal time for stopping the event sequence may further include applying an adaptive AI algorithm that modifies the GP function based on a subset of the first information that corresponds to a most recent portion of the predetermined time interval.

The method may further include using a result of the applying of the non-adaptive AI algorithm to measure a first metric that relates to a quality of the determination of the optimal time for stopping the event sequence.

The method may further include using a result of the applying of the non-adaptive AI algorithm to estimate an uncertainty that relates to the determination of the optimal time for stopping the event sequence.

The event sequence may include a sequence of asset prices that is modeled by using a Deep Gaussian Process (DGP) function that relates to a distribution of a plurality of prior GP functions that each indicate a respective probability density distribution of the asset prices over a predetermined time interval.

According to another exemplary embodiment, a computing apparatus for determining an optimal time for stopping an event sequence is provided. The computing apparatus includes a processor; a memory; and a communication interface coupled to each of the processor and the memory. The processor is configured to: receive, via the communication interface, first information that relates to the event sequence; estimate, based on the first information, a first potential reward that is obtained by stopping the event sequence at a first predetermined time; estimate, based on the first information, a plurality of respective second potential rewards that are obtained by stopping the event sequence at a corresponding one from among a plurality of second predetermined times; and determine, based on the estimated first potential reward and the plurality of estimated second potential rewards, an optimal time for stopping the event sequence.

The processor may be further configured to estimate a value function that relates to a look-ahead value associated with the event sequence at a particular time.

The processor may be further configured to estimate the value function based on an assumption that the value function depends only on a most recent event in the event sequence and a predetermined set of historical data.

The event sequence may include a sequence of asset prices that is modeled by using a Gaussian Process (GP) function that indicates a probability density distribution of the asset prices over a predetermined time interval.

The processor may be further configured to determine the optimal time for stopping the event sequence by applying a non-adaptive artificial intelligence (AI) algorithm that implements a machine learning technique with respect to the first information and the GP function, the non-adaptive AI algorithm being trained by using historical data and fixed warm start data that relates to the event sequence.

The processor may be further configured to determine the optimal time for stopping the event sequence by applying an adaptive AI algorithm that modifies the GP function based on a subset of the first information that corresponds to a most recent portion of the predetermined time interval.

The processor may be further configured to use a result of the application of the non-adaptive AI algorithm to measure a first metric that relates to a quality of the determination of the optimal time for stopping the event sequence.

The processor may be further configured to use a result of the application of the non-adaptive AI algorithm to estimate an uncertainty that relates to the determination of the optimal time for stopping the event sequence.

The event sequence may include a sequence of asset prices that is modeled by using a Deep Gaussian Process (DGP) function that relates to a distribution of a plurality of prior GP functions that each indicate a respective probability density distribution of the asset prices over a predetermined time interval.

According to yet another exemplary embodiment, a non-transitory computer readable storage medium storing instructions for determining an optimal time for stopping an event sequence is provided. The storage medium includes executable code which, when executed by a processor, causes the processor to: receive first information that relates to the event sequence; estimate, based on the first information, a first potential reward that is obtained by stopping the event sequence at a first predetermined time; estimate, based on the first information, a plurality of respective second potential rewards that are obtained by stopping the event sequence at a corresponding one from among a plurality of second predetermined times; and determine, based on the estimated first potential reward and the plurality of estimated second potential rewards, an optimal time for stopping the event sequence.

When executed by the processor, the executable code may further cause the processor to estimate a value function that relates to a look-ahead value associated with the event sequence at a particular time.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for using a Gaussian Process-based algorithm to approximate an optimal stopping of a time series that corresponds to a sequence of events.

FIG. 5 is a diagram that illustrates the steps of a first Gaussian Process-based algorithm that is usable for approximating an optimal stopping of a time series that corresponds to a sequence of events, according to an exemplary embodiment.

FIG. 6 is a diagram that illustrates the steps of a second Gaussian Process-based algorithm that is usable for approximating an optimal stopping of a time series that corresponds to a sequence of events, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
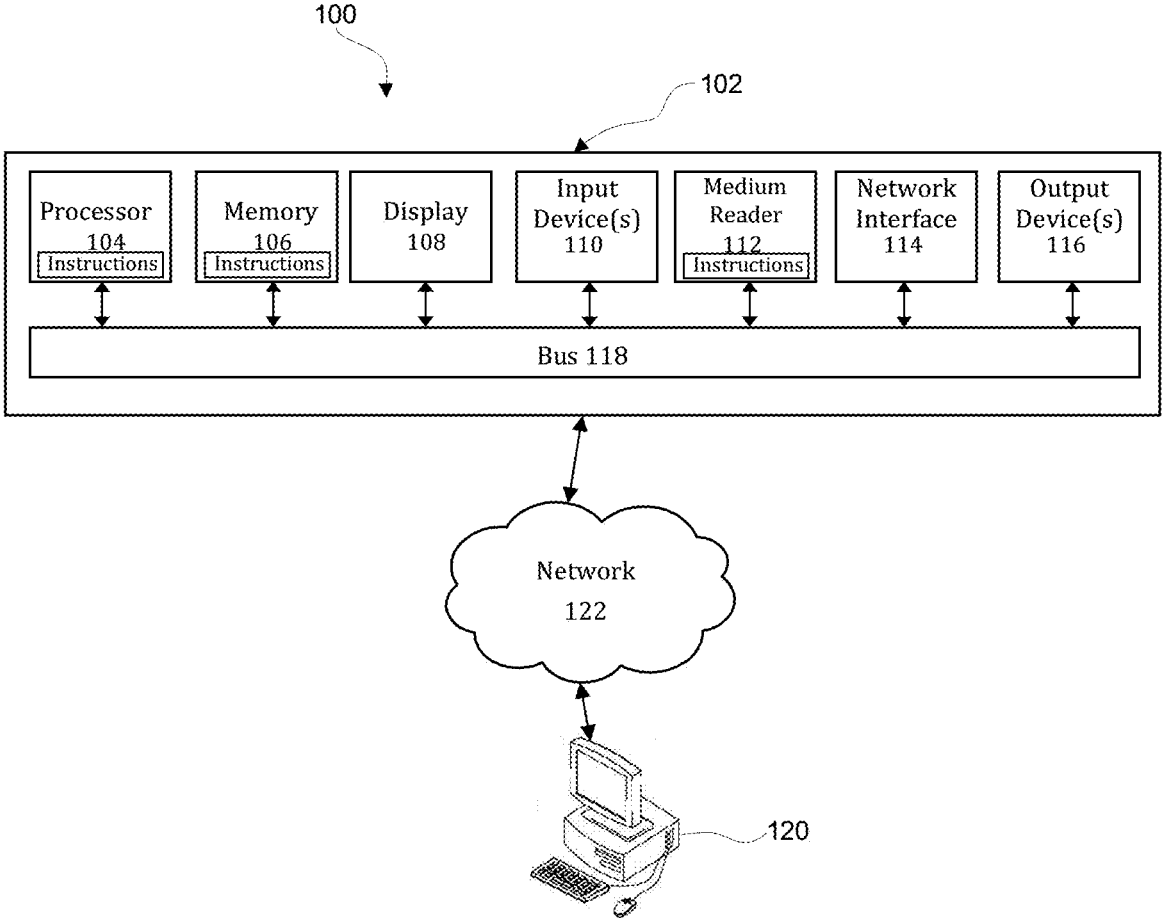
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infra-red, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using a Gaussian Process-based algorithm to approximate an optimal stopping of a time series that corresponds to a sequence of events.

Figure 2:
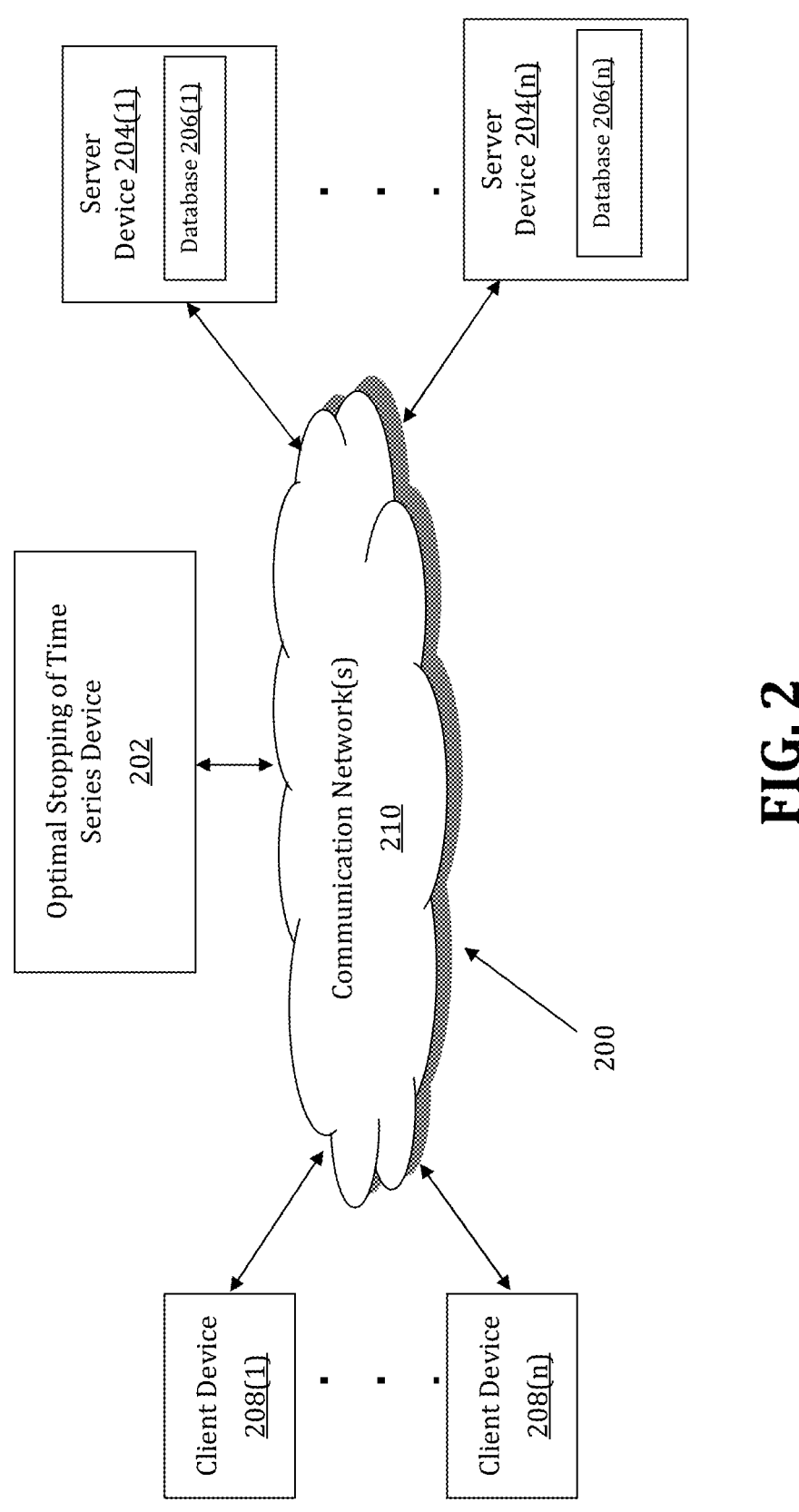
FIG. 2 illustrates an exemplary diagram of a network environment.

Referring to FIG. 2, a schematic of an exemplary network environment 200 for implementing a method for using a Gaussian Process-based algorithm to approximate an optimal stopping of a time series that corresponds to a sequence of events is illustrated. In an exemplary embodiment, the method is executable on any networked computer platform, such as, for example, a personal computer (PC).

The method for using a Gaussian Process-based algorithm to approximate an optimal stopping of a time series that corresponds to a sequence of events may be implemented by an Optimal Stopping of Time Series (OSTS) device 202. The OSTS device 202 may be the same or similar to the computer system 102 as described with respect to FIG. 1. The OSTS device 202 may store one or more applications that can include executable instructions that, when executed by the OSTS device 202, cause the OSTS device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the OSTS device 202 itself, may be located in virtual server(s) running in a cloud-based computing environment rather than being tied to one or more specific physical network computing devices. Also, the application(s) may be running in one or more virtual machines (VMs) executing on the OSTS device 202. Additionally, in one or more embodiments of this technology, virtual machine(s) running on the OSTS device 202 may be managed or supervised by a hypervisor.

In the network environment 200 of FIG. 2, the OSTS device 202 is coupled to a plurality of server devices 204(1)-204(n) that hosts a plurality of databases 206(1)-206(n), and also to a plurality of client devices 208(1)-208(n) via communication network(s) 210. A communication interface of the OSTS device 202, such as the network interface 114 of the computer system 102 of FIG. 1, operatively couples and communicates between the OSTS device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the OSTS device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and OSTS devices that efficiently implement a method for using a Gaussian Process-based algorithm to approximate an optimal stopping of a time series that corresponds to a sequence of events.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The OSTS device 202 may be a standalone device or integrated with one or more other devices or apparatuses, such as one or more of the server devices 204(1)-204(n), for example. In one particular example, the OSTS device 202 may include or be hosted by one of the server devices 204(1)-204(n), and other arrangements are also possible. Moreover, one or more of the devices of the OSTS device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(*n*) in this example may process requests received from the OSTS device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store historical time series data and data that relates to time series-specific parameters and metrics.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the OSTS device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the OSTS device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the OSTS device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the OSTS device 202, the server devices 204(1)-204(*n*), or the client devices 208(1)-208(*n*), for example, may be configured to operate as virtual instances on the same physical machine. In other words, one or more of the OSTS device 202, the server devices 204(1)-204(*n*), or the client devices 208(1)-208(*n*) may operate on the same physical device rather than as separate devices communicating through communication network(s) 210. Additionally, there may be more or fewer OSTS devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
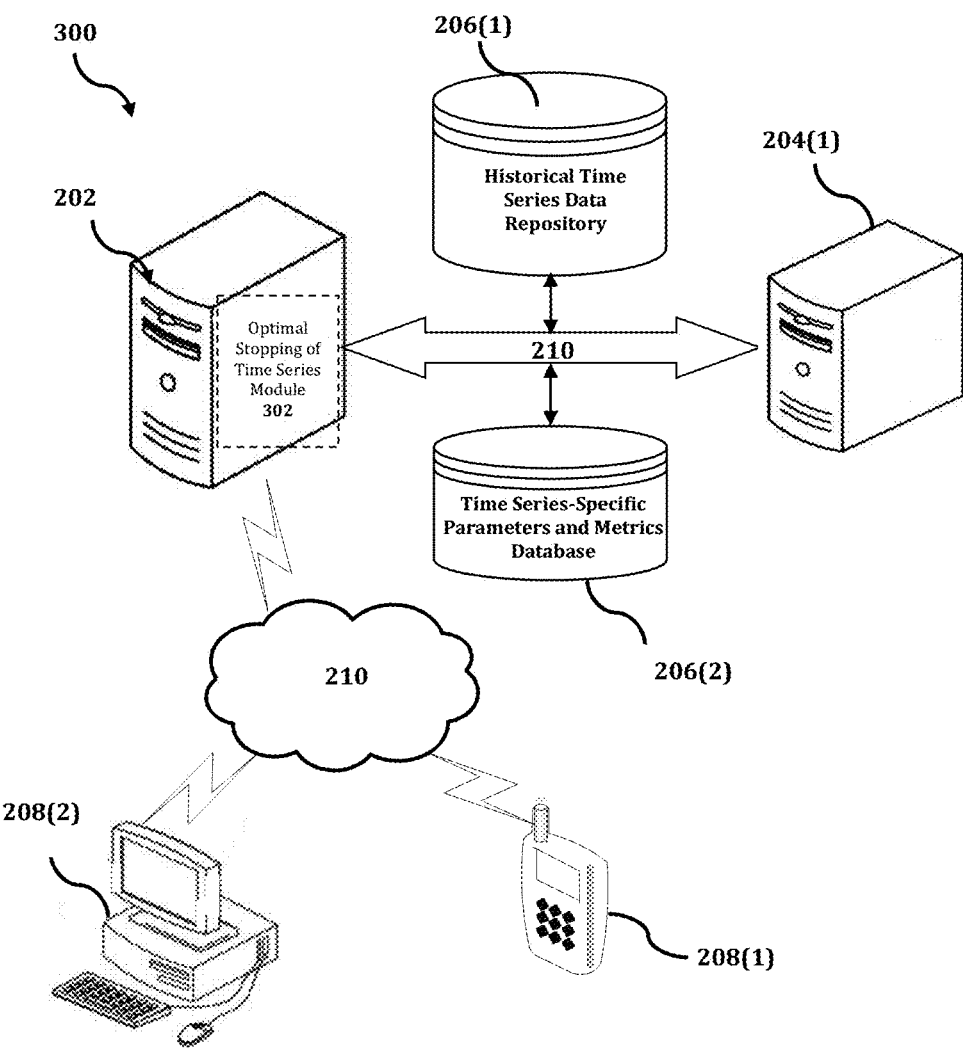
FIG. 3 shows an exemplary system for implementing a method for using a Gaussian Process-based algorithm to approximate an optimal stopping of a time series that corresponds to a sequence of events.

The OSTS device 202 is described and illustrated in FIG. 3 as including an optimal stopping of time series module 302, although it may include other rules, policies, modules, databases, or applications, for example. As will be described below, the optimal stopping of time series module 302 is configured to implement a method for using a Gaussian Process-based algorithm to approximate an optimal stopping of a time series that corresponds to a sequence of events.

An exemplary process 300 for implementing a mechanism for using a Gaussian Process-based algorithm to approximate an optimal stopping of a time series that corresponds to a sequence of events by utilizing the network environment of FIG. 2 is illustrated as being executed in FIG. 3. Specifically, a first client device 208(1) and a second client device 208(2) are illustrated as being in communication with OSTS device 202. In this regard, the first client device 208(1) and the second client device 208(2) may be "clients" of the OSTS device 202 and are described herein as such. Nevertheless, it is to be known and understood that the first client device 208(1) and/or the second client device 208(2) need not necessarily be "clients" of the OSTS device 202, or any entity described in association therewith herein. Any additional or alternative relationship may exist between either or both of the first client device 208(1) and the second client device 208(2) and the OSTS device 202, or no relationship may exist.

Further, OSTS device 202 is illustrated as being able to access a historical time series data repository 206(1) and a time series-specific parameters and metrics database 206(2). The optimal stopping of time series module 302 may be configured to access these databases for implementing a method for using a Gaussian Process-based algorithm to approximate an optimal stopping of a time series that corresponds to a sequence of events.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the OSTS device 202 via broadband or cellular communication. Of course, these embodiments are merely exemplary and are not limiting or exhaustive.

Upon being started, the optimal stopping of time series module 302 executes a process for using a Gaussian Process-based algorithm to approximate an optimal stopping of a time series that corresponds to a sequence of events. An exemplary process for using a Gaussian Process-based algorithm to approximate an optimal stopping of a time series that corresponds to a sequence of events is generally indicated at flowchart 400 in FIG. 4.

In process 400 of FIG. 4, at step S402, the optimal stopping of time series module 302 receives first information that relates to a sequence of events. In an exemplary embodiment, the first information may include a sequence of asset prices.

At step S404, the optimal stopping of time series module 302 models the event sequence by using a Gaussian Process (GP) function that indicates a probability density distribution of the asset prices over a predetermined time interval. Alternatively, the sequence of asset prices may be modeled by using a Deep GP (DGP) function that relates to a distribution of a plurality of prior GP functions that each indicate a relative probability density distribution of the asset prices over a predetermined time interval. In an exemplary embodiment, the GP and DGP functions are intended as example instantiations of more general probabilistic models that are applicable to stopping algorithms that are usable in the process 400.

At step S406, the optimal stopping of time series module 302 estimates a first potential reward that is obtained by stopping the event sequence at a first predetermined time. Then, at step S408, the optimal stopping of time series module 302 estimates a plurality of respective second potential rewards that are obtained by stopping the event sequence at a corresponding one of a plurality of second predetermined times. In this manner, a set of potential rewards is obtained as a function of the stopping times. As an example, when the event sequence corresponds to a sequence of asset prices, the potential reward corresponds to a gain or loss that results from selling the asset versus continuing to hold the asset.

At step S410, the optimal stopping of time series module 302 determines an optimal time for stopping the event sequence. In an exemplary embodiment, the determination of the optimal time for stopping the event sequence is performed by applying an artificial intelligence (AI) algorithm to the first information received in step S402 and to the GP function and/or deep GP function used for modeling the sequence in step S404. In an exemplary embodiment, a value function that relates to a value associated with the event sequence at a particular time, such as, for example, a look-ahead value, may be generated as a result of the application of the AI algorithm. The value function may be generated based on an assumption that the value function depends only on a most recent event in the event sequence and a predetermined set of historical data.

In an exemplary embodiment, the AI algorithm may be a non-adaptive AI algorithm that is trained by using historical data that relates to the event sequence, along with a subset of the first information over a recent portion of the event sequence, also referred to herein as fixed warm start data. In another exemplary embodiment, the AI algorithm may be an adaptive AI algorithm that modifies the GP function based on a subset of the first information that corresponds to a most recent portion of the predetermined time interval associated with the GP function, such as, for example, the latest asset prices over a fixed warm start period and/or the latest information about the event sequence as time progresses and new information is observed.

At step S412, the optimal stopping of time series module 302 uses a result of the application of the AI algorithm to measure a metric that relates to a quality of the determination of the optimal stopping time. Then, at step S414, the optimal stopping of time series module 302 uses a result of the application of the AI algorithm to estimate an uncertainty that relates to the determination of the optimal stopping time.

In an exemplary embodiment, the present disclosure provides a novel group of Gaussian Process (GP) based algorithms for fast approximate optimal stopping of time series, with specific applications to financial markets. It is shown that structural properties commonly exhibited by financial time series, such as the tendency to mean-revert, allow the use of Gaussian and Deep Gaussian Process (DGP) models that further facilitate an ability to analytically evaluate optimal stopping value functions and policies. In addition, uncertainty in the value function may be quantified by propagating the price model through the optimal stopping analysis.

In an exemplary embodiment, the effectiveness of the functional form of GPs is leveraged to provide an efficient solution to optimal stopping problems under minimal assumptions. Such general stopping problems are ubiquitous in finance, for example in the pricing of American options. In particular, the present disclosure provides the following: 1) A novel formulation of the problem of optimally stopping a GP and development of non-adaptive and adaptive algorithms to efficiently solve this problem, with allowances for large quantities of data via time series clustering; 2) extension of the proposed algorithms to use Deep GPs, which have an advantage of not requiring the specification of a GP kernel beforehand; and 3) uncertainty quantification for the proposed optimal stopping value functions.

In an exemplary embodiment, a GP with a specific kernel (i.e., in order to enforce monotonicity) with a value function approximation based on Monte Carlo sampling is used. The GP based family of optimal stopping algorithms uses a piecewise constant value-function approximation evaluated using Gaussian integrals to analytically estimate stopping value functions in a tractable fashion, with the underlying time-series being modeled by a GP. Deep GPs are also used to generalize the proposed algorithms for situations in which the GP kernel cannot be specified in advance.

Optimal Stopping: In an exemplary embodiment, stopping rule problems are defined by two objects: a sequence of random variables $X_1, X_2, \ldots$ whose joint distribution is assumed known, and a sequence of real-valued reward functions $y_0, y_1(x_1), \ldots, y_\infty(x_1, x_2, \ldots)$. Given these two objects, the stopping rule problem can be described as follows. An observer observes the sequence $X_1, X_2, \ldots$ for as long as the observer wishes to do so. For each n=1, 2, $\ldots$, after observing $X_1 = x_1, X_2 = x_2, \ldots, X_n = x_n$, the observer may stop and receive the known reward $y_n(x_1, x_2, \ldots, x_n)$, or the observer may continue and observe $X_{n+1}$. If the observer chooses to continue (and not take any observations), then the observer receives the constant amount, $y_0$. If the observer never stops, then the observer receives $y_\infty(x_1,x_2, \ldots)$.

The goal is to choose a time to stop to maximize the expected reward. Let $\phi_n(x_1, \ldots ,x_n) \in \{0,1\}$ denote the deterministic stopping decision made at stage n having observed $X_1=x_1,X_2=x_2, \ldots ,X_n=x_n$, where $\phi_n(x_1, \ldots ,x_n)=1$ denotes the decision to stop, and $\phi_n(x_1, \ldots ,x_n)=0$ denotes the decision to continue. The observations $(X_1,X_2, \ldots)$ and sequence of decisions $\phi=\{\phi_n(X_1, \ldots ,X_n):n\geq0\}$ determine the random time N at which stopping occurs, where $0\leq N\leq\infty$ and $N=\infty$ means stopping never occurs. The task is then to choose a stopping rule $\phi$ to maximize the expected return, defined as $$V(\phi)=\mathbb{E}\,[y_N(X_1, \ldots ,X_N)]$$

In an exemplary embodiment, the primary interest relates to stopping rule problems with a finite horizon, those that require stopping after observing $X_1, \ldots ,X_T$ for some $T<\infty$. They are obtained as a special case of the general problem above by setting $y_{T+1}= \ldots =y_\infty=-\infty$.

In an exemplary embodiment, the random variables $X_1, \ldots ,X_T$ represent asset prices at times instants $1, \ldots ,T$. For the case where it is desired to find the best time and price at which to sell the asset, the reward function $y_t(x_1, \ldots ,x_t)=x_t$ represents the asset price at time t. Then, the goal of the stopping problem is to find the maximum expected selling price and the time of reaching that price. For the case where it is desired to find the best time and price to buy the asset, the reward function $y_t(x_1, \ldots ,x_t)=-x_t$ represents the negative of the asset price at time t. Then, the goal of the stopping problem is to find the minimum expected buying price and the time of reaching that price. For the sake of clarity, the technique is developed for the former case of finding the best time and price at which to sell an asset. Since the selling decision is made at a single time step, transaction costs of asset trading are ignored. Note that these developed methods are capable of solving any optimal stopping problem even though the description is focused on finding the best time to sell (or buy) an asset. This would require passing the GP model for random variables $X_i$ through the reward functions $y_i(\bullet)$ while computing the stopping value functions.

Dynamic Programming: In principle, finite horizon stopping problems may be solved by the method of backward induction. Since there is a required stop at time T, the optimal rule at time $T-1$ is first determined. Upon knowing the optimal rule at $T-1$, the optimal rule at time $T-2$ is determined, and so on back to the initial time 0 using Principle of Optimality.

Define $V_t(x_1, \ldots ,x_t)$ to be the maximum reward one can obtain starting from time t after having observed $X_1=x_1, \ldots ,X_t=x_t$. Then,
$V_T(x_1, \ldots ,x_T)=y_T(x_1, \ldots ,x_T)$, and
inductively for $t=T-1,T-2, \ldots ,0$:

$$V_t(x_1, \ldots ,x_t)=\max\{y_t(x_1, \ldots ,x_t),\ \mathbb{E}\,[V_{t+1}(X_1, \ldots ,X_t,X_{t+1})|X_1=x_1, \ldots ,X_t=x_t]\} \qquad \text{(Expression 1)}$$

In an exemplary embodiment, the reward for stopping at time t, namely $y_t(x_1, \ldots ,x_t)$, is compared with the reward that would be expected by continuing and using the optimal rule for stages t+1 through T. The optimal reward is therefore the maximum of these two quantities. Further, it is optimal to stop at t if $\mathbb{E}\,[V_{t+1}(X_t, \ldots ,X_t,X_{t+1})|X_1=x_1, \ldots ,X_t=x_t]\}\leq y_t(x_1, \ldots ,x_t)$ and to continue otherwise. The value of the stopping rule problem is $V_0$.

One can see that even for finite horizon stopping problems with a known distribution over $(X_1, \ldots ,X_T)$, finding a solution is nontrivial with the main difficulty being the determination of the value functions. This bottleneck can be alleviated by the assumption of a distributional form for the reward function $y_t(x_1, \ldots ,x_t)$.

Gaussian Processes: In an exemplary embodiment, the asset price, and consequently the stopping reward function, are each modeled as a function of time with a Gaussian Process (GP) prior. A stochastic process $f(s)$ is said to be Gaussian if and only if for every finite set of indices n, the variable $(f(s_1), \ldots ,f(s_n))$ is a multivariate Gaussian random variable. A GP is entirely specified by its mean function $\mu(s)$, and its covariance function $k(s,s')=Cov[f(s),f(s')]$. The covariance function or kernel $k(\bullet,\bullet)$ is symmetric and positive definite. By convention, the mean function $\mu(s)=0$ and we say $f\sim GP(0,k(\bullet,\bullet))$. A Gaussian likelihood is also assumed for the asset price $y_t(x_1, \ldots ,x_t)=x_t$, that is, $$p(y|f) \sim N(f,\ \sigma_n^2), \text{ where } \sigma_n^2$$

is a (small) variance. Equivalently, $y_t(x_1, \ldots ,x_t)=x_t=f(t)+\epsilon$, where $\epsilon$ is Gaussian noise with variance $$\sigma_n^2.$$

Given training data $\mathcal{D}=\{y_1, \ldots ,y_n\}$ comprising asset prices at time instants $1, \ldots ,n$, one may infer the distribution of $f(s^*)$ at a new time instant $s^*$ as follows. Let $y=[y_1 \ldots y_n]^T$ be the vector of observed values, K be the kernel matrix with elements $[K]_{i,j}=k(s_i,s_j)$ and $k_*$ be the vector with elements $[k_*]_i=k(s_*,s_i)$. Then, one can show that the distribution of $f(s^*)$ at a new time instant $s^*$ is Normal, with mean and variance given by $$\mathbb{E}[f(s^*)] = k_*^T\big(K+\sigma_n^2 I\big)^{-1}y \qquad \text{(Expression 2)}$$

$$\text{Var}[f(s^*)] = k(s_*,s_*) - k_*^T\big(K+\sigma_n^2 I\big)^{-1}k_*. \qquad \text{(Expression 3)}$$

The presence of the matrix inverse in these expressions results in a computation time of $O(n^3)$ that can be arduous for applications with $n\geq10^4$. This limitation of GPs may be bypassed by clustering samples in the training set, and fitting a GP to the centroid (most representative sample) of each cluster. The computational complexity is further reduced by clustering an initial warm start period of data.

Deep Gaussian Processes: While GPs are attractive for modeling structured time series data using an appropriate kernel, the quality of their fit depends on the knowledge of this structure beforehand. For mean reverting time series, the fact that the series shows mean reversion is used to fit a GP with an exponential kernel. In cases when such structural information is not known beforehand, the common approach is to fit multiple GPs each with a different kernel and to pick one that performs best on a validation set. Conversely, deep Gaussian Processes (denoted DGPs henceforth) constitute a model for time series where the kernel is learned from the data. DGPs model a distribution on functions constructed by composing functions drawn from GP priors. They are effectively a "deep" version of regular GPs where the outputs of a vector of GPs is fed into the inputs of the next vector of GPs.

One can think of a DGP as a neural network with multiple hidden layers with each hidden unit constituting a GP with a predefined kernel, such as a Radial Basis Function (RBF), rational quadratic or linear kernel. The weights of the DGP are typically fitted by using variational inference using the training data.

The main advantage of DGPs over GPs for modeling structured time series is that the exact knowledge of the structural form is not as necessary for DGPs as it is for GPs. Loosely speaking, the effective kernel in DGPs is learned from data, as opposed to being pre-specified for GPs. To illustrate this, two sets of synthetic asset price data are generated, and each is partitioned into training and test sets. The first set is generated from a GP with an exponential kernel. A GP and a DGP are fitted to the most representative sample (or centroid) of the training set, and an examination of the GP mean function and root mean squared error (RMSE) in prediction over a test set is performed. As a result, it may be seen that the RMSE in predictions over the test set for both fits are fairly close to each other. For the second data set, data is generated data from a DGP with a single hidden layer. A comparison is made with respect to the RMSE in predictions for a GP and a DGP fit to the centroid of another training set. In this case, it may be seen that while the RMSE of the fit DGP is small, that for the fit GP is much larger. This shows that a DGP model does similarly or better than a GP model fit to the same data. Moreover, a GP model may not have the capacity to fit data generated from a DGP model due to its kernel limitations. Thus, DGPs allow for automated kernel fitting while enjoying similar structural properties and computational advantages as GPs.

Problem Setup: In an exemplary embodiment, there is an interest in forecasting for the best time and price to sell an asset given historical asset prices. Let $$\mathcal{D} = \left\{ y_t^i : 1 \leq i \leq N, 1 \leq t \leq T \right\}$$

be training data with $$y_t^i$$

being the asset price at time t in sample i. It is desired to build upon the idea that intra-day and end-of-day asset prices are mean reverting and hence, model them using a GP. Assuming that this structural information helps with a computation of the value function, the stopping policy is computed as the decision to continue (i.e., holding the asset) or to stop (i.e., and sell the asset). Given new (test) asset price series $$y^* = \{ y_1^*, \dots, y_W^* \}$$

up until W<T steps in the day, it is desirable to use the optimal policy to find the best time and price to sell the asset.

Approximations to the value function: In an exemplary embodiment, to make the problem more tractable, two assumptions are made to compute the value function. It is first assumed that the value function depends only on the asset price at the current time instant and the training data D as $$V_t(x_1, \dots, x_t) = \hat{V}_t(x_t | \mathcal{D})$$     (Expression 4).

This is to say that the maximum asset price going forward from time t is a function of only the asset price at time t, and previously observed asset price data.

The second approximation is to assume that the value function conditioned on the training data $\hat{V}_t(x_t | \mathcal{D})$ is piecewise constant in asset price $x_t$. Partition the real line into M<∞ disjoint intervals $$b_i = [b_i^-, b_i^+), \text{ with } B = \bigcup_{i=1}^{M} [b_i^-, b_i^+)$$

being the collection of all such intervals. Note that $b_i^-$ and $$b_i^+$$

are the lower and upper limits respectively for a bin $b_i \in B$, and write the bin center as $$\overline{b}_i = \frac{b_i^- + b_i^+}{2}.$$

Then, this yields $$\hat{V}_t(x_t \mid \mathcal{D}) \approx \sum_{i=1}^{M} \hat{V}_{t,i}(\mathcal{D}) \delta_{x_t \in b_i}$$     (Expression 5)

$$\text{where } \delta_{a \in A} = \begin{cases} 1, & \text{if } a \in A \\ 0, & \text{otherwise} \end{cases}.$$

This approximation becomes as exact equality as M→∞. Using these assumptions leads to the following:

$$\mathbb{E}[V_{t+1}(X_1, \dots, X_t, X_{t+1}) | X_1 = x_1, \dots, X_t = x_t]\} \approx$$     (Expression 6)

$$\sum_{j=1}^{M} \hat{V}_{t+1,j}(\mathcal{D}) \int_{b_j^-}^{b_j^+} P(X_{t+1} = z | \mathcal{D}) dz$$

If $$x_t \in [b_i^-, b_i^+) = b_i,$$

then $$\hat{V}_{t,i}(\mathcal{D}) = \max\left\{ \overline{b}_i, \sum_{j=1}^{M} \hat{V}_{t+1,j}(\mathcal{D}) \int_{b_j^-}^{b_j^+} P(X_{t+1} = z \mid \mathcal{D}) dz \right\}$$     (Expression 7)

with the boundary condition $\hat{V}_{t,i}(\mathcal{D}) = \overline{b}_k$ where $x_T \in b_k$.

Note that the GP (or DGP) model assumption makes the computation of this integral relatively simple using Gaussian distribution functions. The corresponding (approximately) optimal policy is given as $$\hat{\pi}(t, i) = \begin{cases} 1, & \text{if } \hat{V}_{t,i}(\mathcal{D}) = \overline{b}_i \\ 0, & \text{otherwise} \end{cases}$$     (Expression 8)

where $\hat{\pi}(t,i)=1$ denotes that it is optimal to sell the asset at time t if the current asset price lies in bin $b_t$. Likewise, $\hat{\pi}(t,i)=0$ denotes that it optimal to hold the asset. Note that the problem of finding the best time and price to sell the asset has been decomposed into a series of stopping decisions $\hat{\pi}(\bullet,\bullet)$ specifying the action to take at every time based on the asset price.

Metric to measure quality of stopping policy: Now that it is theoretically possible to find a stopping policy as described above, there is a need for a metric to quantify its performance. Define the suboptimality of a policy $\hat{\pi}$: $\{1, \dots ,T\}\times\{1, \dots ,M\}\rightarrow\{0,1\}$ over a price series $y=\{y_1, \dots ,y_T\}$ as $$Sub(\hat{\pi}, y) = \left(\max_{1 \le t \le T} y_t\right) - \sum_{t=1}^{T}\sum_{i=1}^{M}\hat{\pi}(t, i)\cdot y_t \cdot \delta_{y_t \in b_i} \qquad \text{(Expression 9)}$$

This expression captures the difference in the true maximum asset price, and the predicted maximum price resulting from policy $\hat{\pi}$. Clearly $Sub(\hat{\pi},y)\ge0$ with lower values characterizing better stopping policies. When the prices are given in dollar amounts, $Sub(\hat{\pi},y)$ as computed above is also in a dollar amount. When comparing suboptimality values across assets, it is helpful to express $Sub(\hat{\pi},y)$ in basis points (denoted bps henceforth). The suboptimality may be computed in bps by dividing the suboptimality in dollars by the arithmetic mean of sample asset prices in dollars, and multiplying the result by $10^4$.

Uncertainty quantification: One of the main advantages of using a GP as a model for time series is the predictive uncertainty that comes along with it. Using the fact that the price series is modeled as a GP (or DGP), the price random variable can be expressed as $X_t \sim p_{X_t}(\bullet|\mathcal{D})$. Since the asset prices are binned, the following random variable for bins $$\{b_i\}_{i=1}^{M}$$

may be introduced:

$$S_t = \sum_{i=1}^{M}\delta_{X_t \in b_i} \cdot i$$

This allows for an expression of the value function for each bin in a probabilistic way paving the way to estimate the uncertainty of the value function. If the definition $$p_{t,j} = P(S_t = j) = \int_{b_j^-}^{b_j^+} p_{X_t}(z \mid \mathcal{D})dz$$

is provided, and $E_{t+1}=\mathbb{E}_{S_{t+1}}[\hat{V}_{t+1,S_{t+1}}(\mathcal{D})]$, then the probability mass function (PMF) of $\hat{V}_{t,S_t}(\mathcal{D})$ is $$P(\hat{V}_{t,S_t}(\mathcal{D}) = v) = \begin{cases} 0, & \text{if } v < E_{t+1} \\ \sum p_{t,i}, & \text{if } v = E_{t+1} \\ i: & \overline{b_i} < E_{t+1} \\ p_{t,j}, & \text{for all } j:v = \overline{b_J} > E_{t+1} \end{cases} \qquad \text{(Expression 10)}$$

Intuitively, the above distribution of Expression 10 is a folded version of the binned price distribution as any value smaller than $E_{t+1}$ gets a zero probability. This expression can be directly used to evaluate measures of uncertainty (e.g. variance) for the value function.

In an exemplary embodiment, the methodology works by fitting a GP (or DGP) to pre-processed training data D to evaluate the term inside the integral in Expression 7.

Time Series Clustering: The training set $\mathcal{D}$ is preprocessed by partitioning it into $K\ge1$ clusters as $\mathcal{D}=\mathcal{D}_1 \cup \mathcal{D}_2 \dots \cup \mathcal{D}_K$ with each cluster $\mathcal{D}_k$ containing $n_k$ training samples over the initial time period $\{1, \dots ,W\}$. Define the log return (or simply return) of an asset with price $y_t$ at time t as $$r_t=\log y_{t+\delta t}-\log y_t$$

where $\delta t$ is a pre-defined time scale for computing returns. The standard deviation of asset returns is a measure of asset volatility.

The clustering method takes in log returns of asset price time series as input and clusters them by grouping time series with similar volatility together. The reason for this clustering stems from the fact that asset prices can exhibit different levels of volatility based on market regimes as well as seasonal fluctuations across different assets. This also facilitates an ability to pick the most relevant cluster to compute an optimal stopping policy when presented with new (test) asset prices.

In an exemplary embodiment, a clustering algorithm called Dynamic Time Warping (DTW) that seeks to find a minimal-distance alignment between times series that is robust to shifts or dilations in time, unlike the classical Euclidean metric, is leveraged. For a pair of series of lengths m and n, there exists an O(mn) algorithm that solves DTW using dynamic programming. After partitioning the training set $\mathcal{D}$ into K clusters, each cluster is summarized with a centroid time series that is meant to capture the essence of the series in each cluster. The DTW centroids are computed using the DTW Barycenter Averaging Algorithm (DBA). These time series clustering and centroid computation methods are employed in a plug-and-play manner from the Tslearn package. Note that K=1 corresponds to summarizing all of the data in $\mathcal{D}$ with a single centroid.

FIG. 5 is a diagram 500 that illustrates the steps of a first Gaussian Process-based algorithm that is usable for approximating an optimal stopping of a time series that corresponds to a sequence of events, according to an exemplary embodiment. FIG. 6 is a diagram 600 that illustrates the steps of a second Gaussian Process-based algorithm that is usable for approximating an optimal stopping of a time series that corresponds to a sequence of events, according to an exemplary embodiment.

Algorithms: In an exemplary embodiment, the training data is clustered and centroids are computed for each cluster. When presented with (test) asset price series $$y^* = \{y_1^*, \dots , y_W^*\}$$

up until W<T steps in the day, a cluster is first assigned to y* based on the clustering on the training data. This helps with assigning the test series to a cluster with similar statistical properties such as volatility. A GP or DGP is fitted to the test series over steps $1, \dots ,W$ and augmented with the cluster centroid over steps $W+1, \dots ,T$. This GP or DGP fit is used to compute the value function and stopping policy as in Expressions 7 and 8. The stopping policy of that cluster is then used to find the best time and price to sell for the test series. This algorithm is called Gaussian Process based Optimal Stopping (GPOS) and is presented in Algorithm 1, as illustrated in FIG. 5.

Note that GPOS does not change the GP or DGP fit as the new test series is observed over time steps W+1, . . . ,T. This can result in poor performance when the test series is rather different from the training set post the initial period 1, . . . ,W. To handle such cases, advantageous use is made of an adaptive version of GPOS that re-fits the GP or DGP upon observing every new step of the new test series, while using past information for the remaining time steps. Referring to FIG. 6, this is given in Algorithm 2, where the value function and stopping policy are recomputed upon observing every new step of the test series, with the training set used for clustering and filling up the remainder of unobserved time steps.

Benchmarks—Sample Optimal Stopping: In an exemplary embodiment, an intuitive benchmark for optimal stopping algorithms that computes the stopping policy without using any structural information about the time series, such as mean reversion, is provided. This benchmark is called Sample Optimal Stopping (SOS), because it computes approximations to the value function as in Expression 1 using the asset price samples in set $\mathcal{D}$. Define the value function for sample i at time t to be the highest asset price seen at/after t:

$$V_t^i = \max_{t \le s \le T} y_s^i \qquad \text{(Expression 11)}$$

and the average value function for the set $\mathcal{D}$ at time t as $$V_t = \frac{1}{N} \sum_{i=1}^{N} V_t^i. \qquad \text{(Expression 12)}$$

Expression 12 estimates the true value function used to compute the stopping policy as $$\hat{\pi}(t, i) = \begin{cases} 1, & \text{if } \overline{b}_i \le V_t \\ 0, & \text{otherwise} \end{cases}$$

when the price lies in bin $b_i$.

Deep Optimal Stopping: In an exemplary embodiment, advantageous use is made of a deep learning-based optimal stopping benchmark, referred to herein as DOS for Deep Optimal Stopping, that is trained to learn the stopping policies given samples of the time series data. The DOS benchmark is usable for decomposing the problem of finding the best time to stop and sell the asset into a series of stopping decisions to be made at every time step, which is referred to herein as the stopping policy $\pi(\cdot,\cdot)$. This stopping policy may be modeled at every time instant with a neural network (NN) that is fit to minimize the difference between the left and right sides of Expression 1. To have a fair comparison between Algorithms 1 and 2 and DOS, the pre-processing part is retained, including clustering the training data before learning the stopping policy within each cluster. An important note is that DOS learns as many NNs as there are time steps T, so that the stopping policy at a time step is given by a different NN than that at other time steps.

Accordingly, with this technology, a process for using a Gaussian Process-based algorithm to approximate an optimal stopping of a time series that corresponds to a sequence of events is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for determining an optimal time for stopping an event sequence, the method being implemented by at least one processor, the method comprising:

receiving, by the at least one processor, first information that relates to the event sequence, wherein the event sequence includes a sequence of values that is modeled by using a Gaussian Process (GP) function that indicates a probability density distribution of the values over a predetermined time interval;

estimating, by the at least one processor based on the first information, a first potential reward that is obtained by stopping the event sequence at a first predetermined time;

estimating, by the at least one processor based on the first information, a plurality of respective second potential rewards that are obtained by stopping the event sequence at a corresponding one from among a plurality of second predetermined times; and determining, based on the estimated first potential reward and the plurality of estimated second potential rewards, an optimal time for stopping the event sequence, wherein the determining of the optimal time for stopping the event sequence comprises applying a non-adaptive artificial intelligence (AI) algorithm that implements a machine learning technique with respect to the first information and the GP function, the non-adaptive AI algorithm being trained by using historical data and fixed warm start data that relates to the event sequence, wherein the historical data used in training the non-adaptive AI algorithm are clustered and GP function is fitted to a centroid of each cluster for reducing computational complexity, and wherein the fixed warm start data is provided by clustering, by the at least one processor, an initial warm start period of data that relates to the event sequence for reducing computational complexity.

2. The method of claim 1, wherein the determining of the optimal time for stopping the event sequence comprises estimating a value function that relates to a look-ahead value associated with the event sequence at a particular time.

3. The method of claim 2, wherein the estimating of the value function is based on an assumption that the value function depends only on a most recent event in the event sequence and a predetermined set of historical data.

4. The method of claim 1, wherein the determining of the optimal time for stopping the event sequence further comprises applying an adaptive AI algorithm that modifies the GP function based on a subset of the first information that corresponds to a most recent portion of the predetermined time interval.

5. The method of claim 1, further comprising using a result of the applying of the non-adaptive AI algorithm to measure a first metric that relates to a quality of the determination of the optimal time for stopping the event sequence.

6. The method of claim 1, further comprising using a result of the applying of the non-adaptive AI algorithm to estimate an uncertainty that relates to the determination of the optimal time for stopping the event sequence.

7. The method of claim 1, wherein the event sequence is modeled by using a Deep Gaussian Process (DGP) function that relates to a distribution of a plurality of prior GP functions that each indicate a respective probability density distribution of the values over a predetermined time interval.

8. A computing apparatus for determining an optimal time for stopping an event sequence, the computing apparatus comprising:

a processor;

a memory; and a communication interface coupled to each of the processor and the memory, wherein the processor is configured to:

receive, via the communication interface, first information that relates to the event sequence, wherein the event sequence includes a sequence of values that is modeled by using a Gaussian Process (GP) function that indicates a probability density distribution of the values over a predetermined time interval;

estimate, based on the first information, a first potential reward that is obtained by stopping the event sequence at a first predetermined time;

estimate, based on the first information, a plurality of respective second potential rewards that are obtained by stopping the event sequence at a corresponding one from among a plurality of second predetermined times; and determine, based on the estimated first potential reward and the plurality of estimated second potential rewards, an optimal time for stopping the event sequence, wherein the determination of the optimal time for stopping the event sequence comprises applying a non-adaptive artificial intelligence (AI) algorithm that implements a machine learning technique with respect to the first information and the GP function, the non-adaptive AI algorithm being trained by using historical data and fixed warm start data that relates to the event sequence, wherein the historical data used in training the non-adaptive AI algorithm are clustered and GP function is fitted to a centroid of each cluster for reducing computational complexity, and wherein the fixed warm start data is provided by clustering an initial warm start period of data that relates to the event sequence for reducing computational complexity.

9. The computing apparatus of claim 8, wherein the processor is further configured to estimate a value function that relates to a look-ahead value associated with the event sequence at a particular time.

10. The computing apparatus of claim 9, wherein the processor is further configured to estimate the value function based on an assumption that the value function depends only on a most recent event in the event sequence and a predetermined set of historical data.

11. The computing apparatus of claim 8, wherein the processor is further configured to determine the optimal time for stopping the event sequence by applying an adaptive AI algorithm that modifies the GP function based on a subset of the first information that corresponds to a most recent portion of the predetermined time interval.

12. The computing apparatus of claim 8, wherein the processor is further configured to use a result of the application of the non-adaptive AI algorithm to measure a first metric that relates to a quality of the determination of the optimal time for stopping the event sequence.

13. The computing apparatus of claim 8, wherein the processor is further configured to use a result of the application of the non-adaptive AI algorithm to estimate an uncertainty that relates to the determination of the optimal time for stopping the event sequence.

14. The computing apparatus of claim 8, wherein the event sequence is modeled by using a Deep Gaussian Process (DGP) function that relates to a distribution of a plurality of prior GP functions that each indicate a respective probability density distribution of the values over a predetermined time interval.

15. A non-transitory computer readable storage medium storing instructions for determining an optimal time for stopping an event sequence, the storage medium comprising executable code which, when executed by a processor, causes the processor to:

receive first information that relates to the event sequence;

estimate, based on the first information, a first potential reward that is obtained by stopping the event sequence at a first predetermined time;

estimate, based on the first information, a plurality of respective second potential rewards that are obtained by stopping the event sequence at a corresponding one from among a plurality of second predetermined times; and determine, based on the estimated first potential reward and the plurality of estimated second potential rewards, an optimal time for stopping the event sequence, wherein the determination of the optimal time for stopping the event sequence comprises applying a non-adaptive artificial intelligence (AI) algorithm that implements a machine learning technique with respect to the first information and the GP function, the non-adaptive AI algorithm being trained by using historical data and fixed warm start data that relates to the event sequence, wherein the historical data used in training the non-adaptive AI algorithm are clustered and GP function is fitted to a centroid of each cluster for reducing computational complexity, and wherein the fixed warm start data is provided by clustering an initial warm start period of data that relates to the event sequence for reducing computational complexity.

16. The storage medium of claim 15, wherein when executed by the processor, the executable code further causes the processor to estimate a value function that relates to a look-ahead value associated with the event sequence at a particular time.

* * * * *